(12) United States Patent
Badertscher et al.

(10) Patent No.: US 12,350,772 B1
(45) Date of Patent: Jul. 8, 2025

(54) APPARATUS AND METHOD FOR EXTRACTING A SEIZED YAW PISTON FROM A WIND TURBINE HOUSING

(71) Applicants: Chad Badertscher, Ransom, IL (US); Zachary Chervinko, Ransom, IL (US); David Feltman, Ransom, IL (US)

(72) Inventors: Chad Badertscher, Ransom, IL (US); Zachary Chervinko, Ransom, IL (US); David Feltman, Ransom, IL (US)

( * ) Notice: Subject to any disclaimer, the term of this patent is extended or adjusted under 35 U.S.C. 154(b) by 0 days.

(21) Appl. No.: 18/927,996

(22) Filed: Oct. 26, 2024

Related U.S. Application Data

(60) Provisional application No. 63/545,932, filed on Oct. 26, 2023.

(51) Int. Cl.
| | |
|---|---|
| *B23P 19/04* | (2006.01) |
| *B23P 6/02* | (2006.01) |
| *B23P 19/02* | (2006.01) |
| *F03D 80/50* | (2016.01) |

(52) U.S. Cl.
CPC ............... *B23P 19/04* (2013.01); *B23P 6/02* (2013.01); *B23P 19/025* (2013.01); *F03D 80/50* (2016.05); *F05B 2230/70* (2013.01); *F05B 2230/80* (2013.01)

(58) Field of Classification Search
CPC .... B23P 6/002; B23P 6/02; B23P 6/00; B23P 19/025; B23P 19/027; B23P 19/04; Y10T 29/4925; Y10T 29/49318; Y10T 29/49721; Y10T 29/49821; Y10T 29/49822; Y10T 29/5383; F03D 80/50; F05B 2230/70; F05B 2230/80
See application file for complete search history.

(56) References Cited

U.S. PATENT DOCUMENTS

2019/0032736 A1* 1/2019 Muleski ................ F03D 7/0248

FOREIGN PATENT DOCUMENTS

| KR | 20090062360 A | * | 6/2009 |
| KR | 102366725 B1 | * | 2/2022 |

* cited by examiner

*Primary Examiner* — Matthew P Travers
(74) *Attorney, Agent, or Firm* — Steven Ivy P.C.

(57) ABSTRACT

A device and method for removing a seized yaw piston from a wind turbine housing is disclosed. The device features a boring plug with retention screws to secure the piston during operation and mounting plates for attaching the boring motor. The boring motor operates a cutter to remove the piston's core. The rotary motor is manually rotated allowing the cutting wheel to create a separating cut designed to sever a mushroomed ring from the barrel of the yaw piston. A puller tool, equipped with expandable wedge plates and a puller screw, grips the piston barrel through the separating cut. A hydraulic actuator, connected to the puller screw, applies force to extract the piston barrel. A tube spacer ensures proper alignment, and manual tools assist in breaking the mushroomed ring for easy removal.

15 Claims, 21 Drawing Sheets

APPARATUS AND METHOD FOR EXTRACTING A SEIZED YAW PISTON FROM A WIND TURBINE HOUSING

RELATED PATENT APPLICATION

The present Non-Provisional U.S. Patent application claims priority under 35 U.S.C. § 119 (e) to U.S. Provisional Patent Application No. 63/545,932 tiled DEVICE AND METHOD FOR REMOVING SEIZED WIND TURBINE YAW PISTON FROM ITS HOUSING, filed on Oct. 26, 2023, the subject matter of which is incorporated herein by reference.

FIELD OF INVENTION

The present invention relates to the general field of wind turbines, and applicable thereto repair and maintenance tools.

BACKGROUND OF THE INVENTION

Wind power plants employ turbines to convert wind energy into electrical energy. This conversion is achieved through aerodynamic forces acting on the rotor blades, which drive the rotation of a generator to produce electricity. The global wind turbine market reached $60 billion in 2022 and is projected to grow to approximately $108.98 billion by 2032. As of January 2022, wind farms—large installations of wind turbines—generated over 650 gigawatts of power, with 60 GW added annually, contributing significantly to the world's electricity supply.

Like other complex mechanical systems, wind turbines require routine inspections and maintenance to ensure the functionality of their mechanical and electrical components. Common issues include blade damage, gearbox malfunctions, sensor anomalies, tower corrosion, and yaw and pitch system failures.

Yaw and pitch systems are critical to optimizing wind capture and turbine performance. In particular, the yaw system, which includes yaw pistons, ensures that the nacelle (the housing for the generator and other key components) is properly aligned to face the wind. This alignment allows the rotor blades to maximize energy capture. The yaw piston, part of the yaw drive mechanism, controls the rotational movement of the nacelle, adjusting the direction of the wind turbine as the wind shifts. Typically hydraulic or pneumatic, the yaw piston is connected to the main shaft and operated by the turbine's control system. When the wind direction changes, the yaw drive activates the yaw piston to turn the nacelle, ensuring optimal energy capture.

The continuous adjustment of the nacelle is essential for efficient operation and maximum power generation. However, frequent failures occur in yaw and pitch systems due to severely seized yaw pistons that become stuck inside the external steel housing. These seized pistons, often referred to as mushroomed pistons due to their deformed shape, are made from soft bronze. Their removal becomes especially challenging when damage or an accumulation of grease and dirt causes them to bind tightly within the housing. Often, the confined space inside the turbine makes it impossible to remove the seized pistons with standard tools.

The present invention, "Apparatus and Method for Extracting a Seized Yaw Piston from a Wind Turbine Housing" (Piston Remover), is a system that incorporates three specialized portable power tools, each assigned to a distinct operation:

Operation 1: A boring motor, boring plug, and boring cutter are used to remove the center core of the yaw piston.

Operation 2: A rotary motor with a cutting wheel creates a separating cut along the ring cut-off plane to sever the mushroomed piston ring from the piston barrel.

Operation 3: A hydraulic tubular actuator and puller tool, with wedge plates and a puller screw, extract the piston barrel from the housing.

This innovative solution provides a safe, efficient, and systematic method for breaking apart and removing severely damaged or tightly lodged yaw pistons, overcoming the limitations of conventional tools in confined turbine spaces.

BRIEF SUMMARY OF THE INVENTION

The following is intended to be a brief summary of the invention and is not intended to limit the scope of the invention:

The "Apparatus and Method for Extracting a Seized Yaw Piston from a Wind Turbine Housing" provides a safe and efficient solution for removing yaw pistons that have become stuck due to damage, dirt, grease, or deformation into mushroomed piston rings. These pistons, essential to the yaw system, control the rotational movement of the nacelle, ensuring optimal alignment of rotor blades with the wind direction for maximum energy capture. The system leverages three distinct operations supported by power tools and specialized components to extract seized yaw pistons from their housing.

Operation 1 begins with the removal of the piston washer from the yaw piston. A boring plug is then inserted into the housing, with retention screws securing the piston in place. A boring motor rotates a shaft and cutter through the piston cavity, removing the center core of the yaw piston to prepare for the next step.

In Operation 2, a rotary motor with a cutting wheel is mounted on the housing. The operator manually rotates the motor to create a separating cut along the ring cut-off plane, severing the mushroomed piston ring from the piston barrel. A vacuum system removes debris, ensuring that the ring is loose and ready for extraction.

Operation 3 involves inserting a puller tool into the piston cavity. The puller tool consists of wedge plates that expand within the separating cut when a puller screw (Acme threaded rod) is rotated. The screw, connected to a hydraulic tubular actuator via an Acme nut, is used to apply force, retracting the puller tool and extracting the piston barrel. After extraction, manual tools like a hammer and chisel break the mushroomed ring into smaller pieces for removal. Finally, the piston puck is removed, completing the process.

This invention addresses the challenges of removing seized yaw pistons in confined turbine spaces where conventional tools are ineffective. Its modular design-featuring a boring plug, rotary motor, and puller tool-ensures easy assembly, operation, and maintenance, making it adaptable for various turbine systems. The sequential operations minimize the risk of damage to the housing and surrounding components, ensuring an efficient and reliable extraction process.

DESCRIPTIVE KEY

100—Apparatus and Method for Extracting a Seized Yaw Piston from a Wind Turbine Housing ("Piston Remover")

Components for Operation 1

101—boring motor
102—boring mounting plate

103—boring plug
  104—plug flange
  105—threaded boring barrel
  106—boring hole
107—boring shaft
108—boring cutter
109—plurality of retention screws
110—plurality of mounting screws Components for Operation 2

111—rotary motor
112—rotary mounting plate
113—cutting wheel shaft
114—cutting wheel
115—vacuum system Components for Operation 3

116—hydraulic tubular actuator
117—puller tool
  118—two wedge plates
  119—clamp
  120—threaded wedge hole
  121—puller screw (Acme threaded rod)
  122—threaded connector (Acme nut)
  123—tube spacer
  124—plurality of manual tools (hammer and chisel)
Wind Turbine Components
  200—yaw piston
    201—piston rim
    202—center core
    203—piston cavity
    204—ring cut-off plane
    205—separating cut
    206—piston barrel
    207—mushroomed piston ring
    208—piston puck
    209—piston washer
  300—housing
    301—housing rim
  400—wind turbine

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DETAILED DESCRIPTION AND BEST MODE OF IMPLEMENTATION

Figure 1:
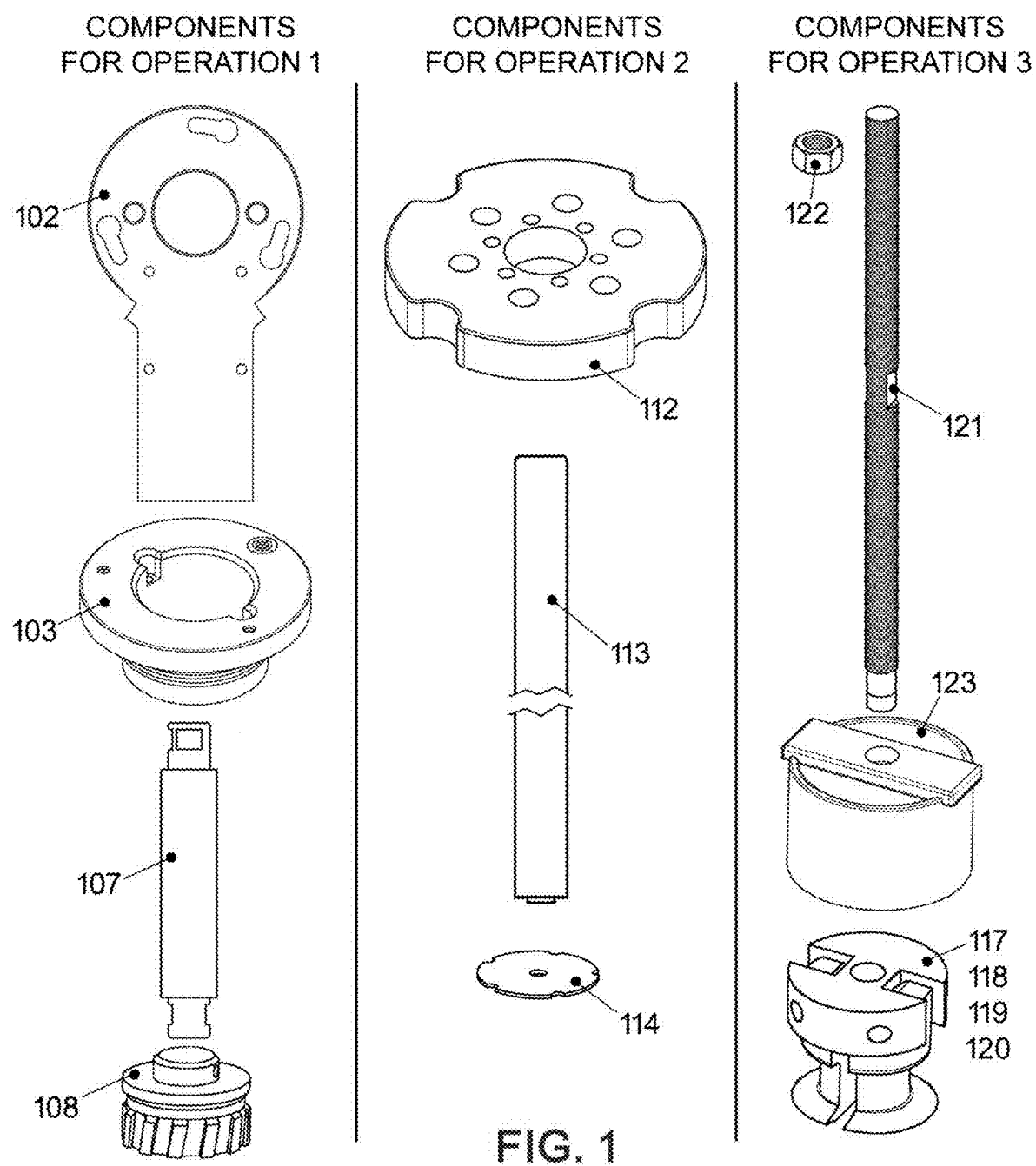
FIG. 1 shows the components making up the present invention titled "Apparatus and Method for Extracting a Seized Yaw Piston from a Wind Turbine Housing," divided into three operations representing different stages of the process. Operation 1 shows the components used during the boring operation, where a boring motor (not shown) rotating a cutter removes the piston's center core. Operation 2 shows the components used with the rotary motor (not shown); here, a cutting wheel creates a separating cut along the ring cut-off plane to sever the mushroomed piston ring from the piston barrel. Operation 3 shows the components used with a hydraulic tubular actuator (not shown); here, a puller tool extracts the piston barrel from the housing. Following this operation manual tools, such as a hammer and chisel, are used to break and remove the mushroomed ring and piston puck (not shown). In accordance with an exemplary embodiment of the present invention.
Figure 2:
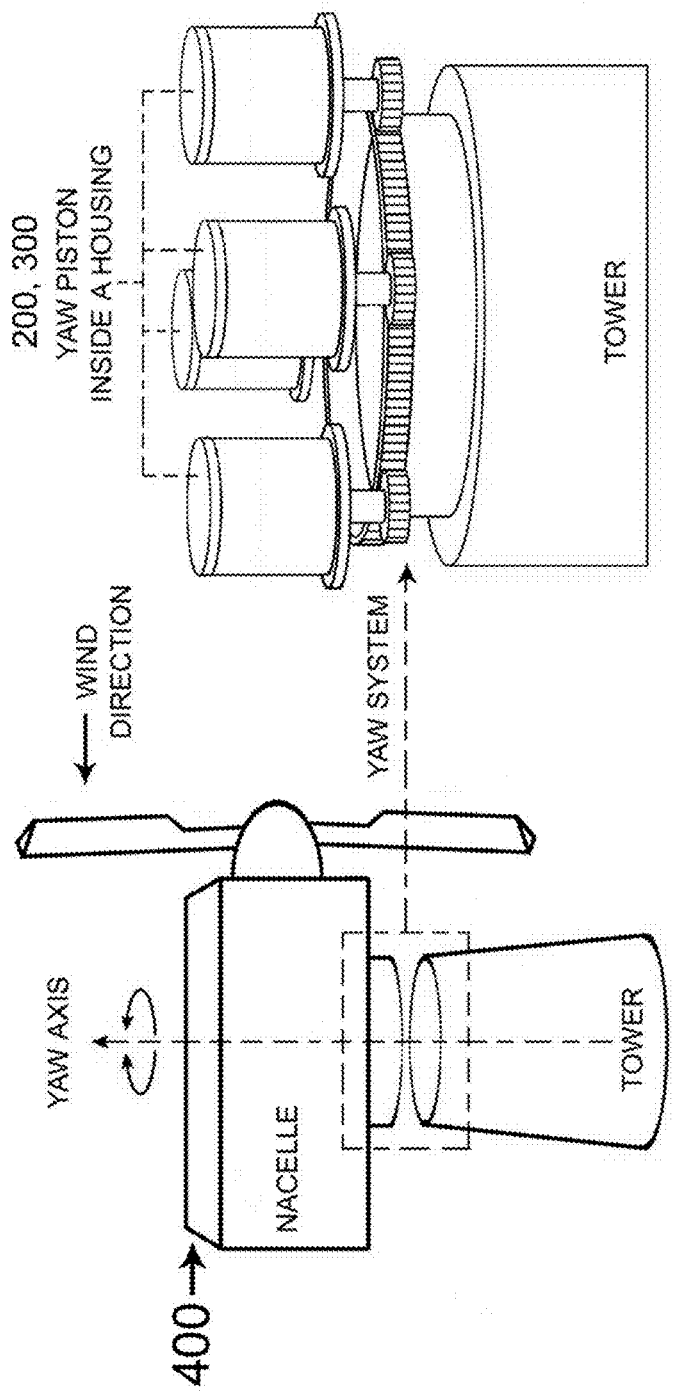
FIG. 2 shows a wind turbine, specifically highlighting the yaw system located between the nacelle and the tower. The illustration focuses on the location and function of a housing that contains the yaw piston, with each turbine typically having several such pistons within the system. In accordance with an exemplary embodiment of the present invention.
Figure 3:
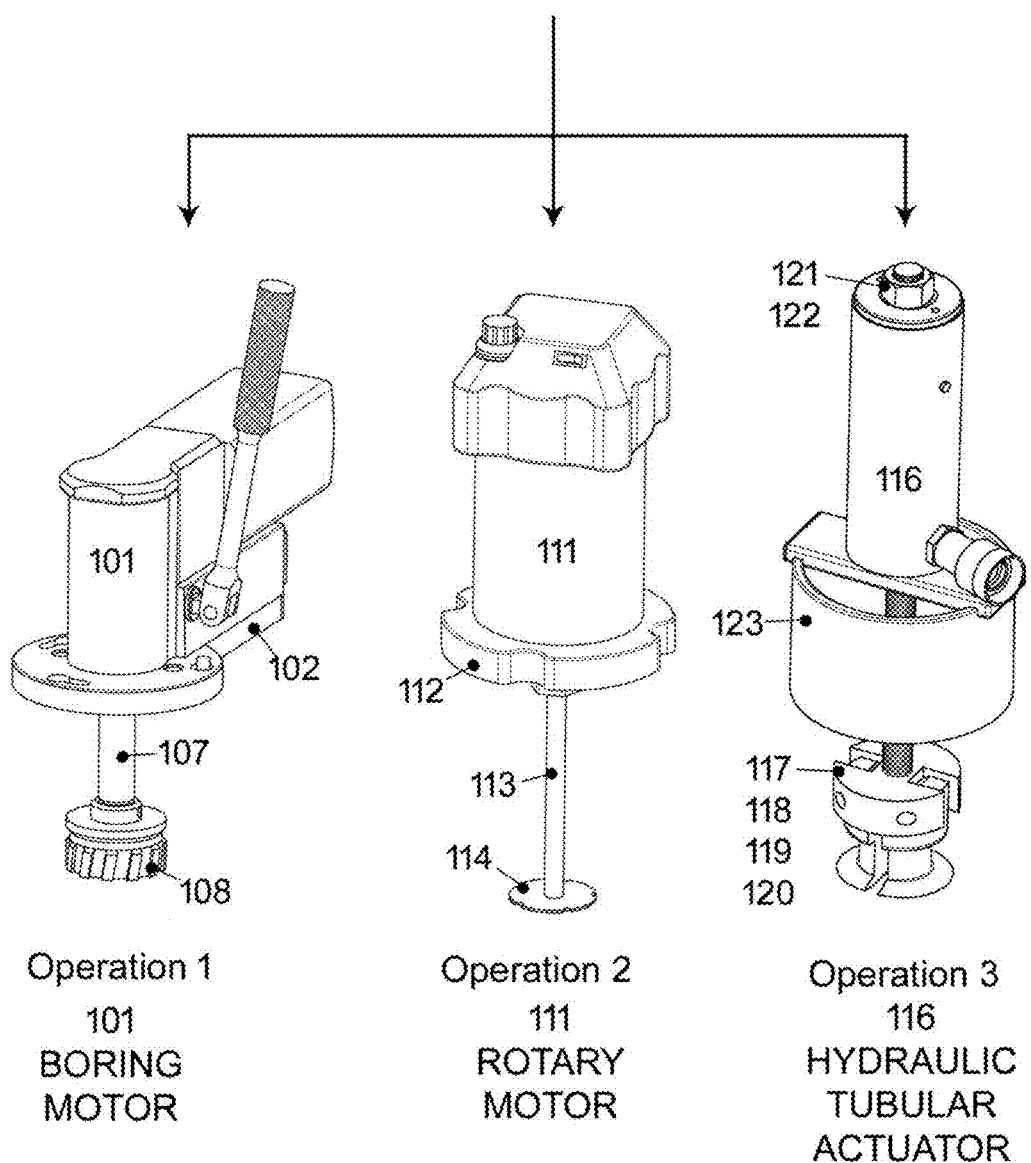
FIG. 3 shows the power tools used to implement the present invention, along with various components associated with these tools. Descriptive numbers identify the specific power tools required for each operation. Specifically, Operation 1 utilizes a boring motor, Operation 2 uses a rotary motor, and Operation 3 employs a hydraulic tubular actuator. While these power tools are not part of the invention itself, they are essential for providing the necessary power to operate the components identified in the present invention. In accordance with an exemplary embodiment of the present invention.
Figure 4:
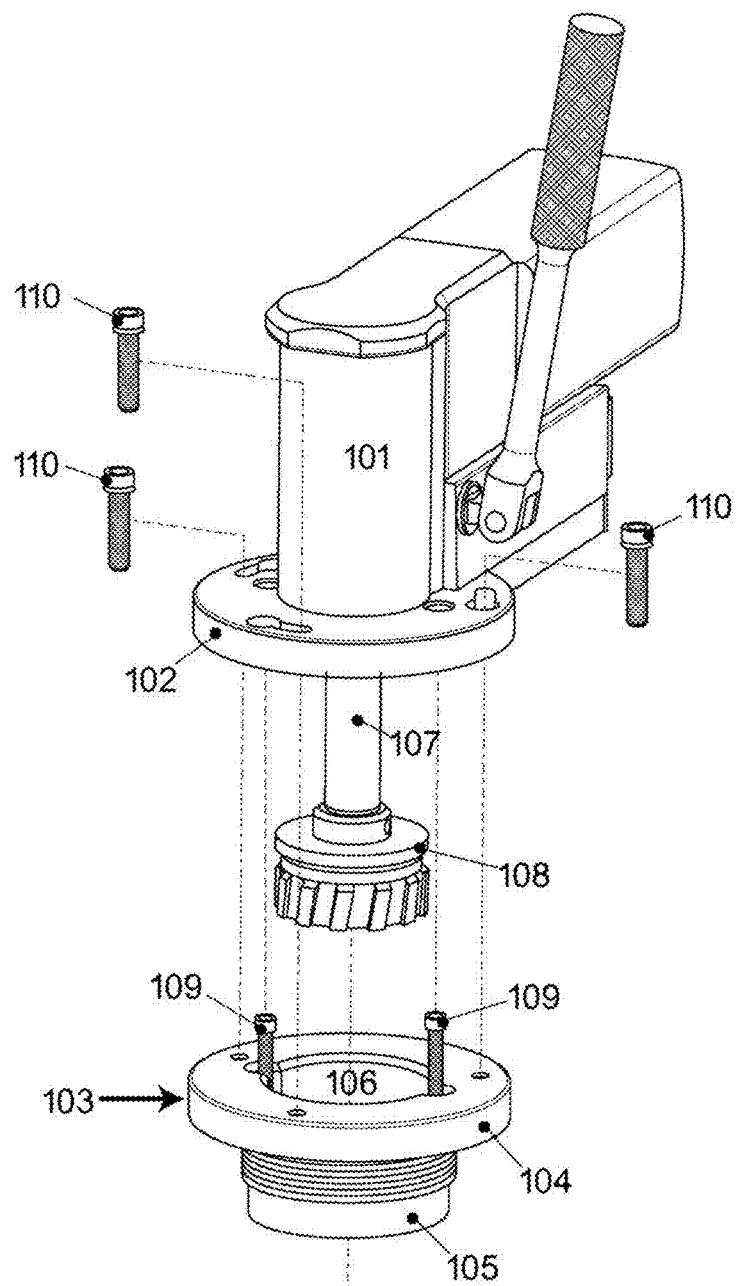
FIG. 4 shows the boring motor (used during Operation 1), along with the attached boring mounting plate, boring shaft, and boring cutter. The figure also depicts the boring plug, which includes a plug flange, threaded boring barrel, and a boring hole through which the boring cutter is inserted during operation. Additionally, it shows a plurality of retention screws designed to press against the piston rim to prevent its movement. The figure provides a clear view of the mounting screws used to releasably connect the boring plug to the boring mounting plate, which secures the boring motor in place. In accordance with an exemplary embodiment of the present invention.
Figure 5:
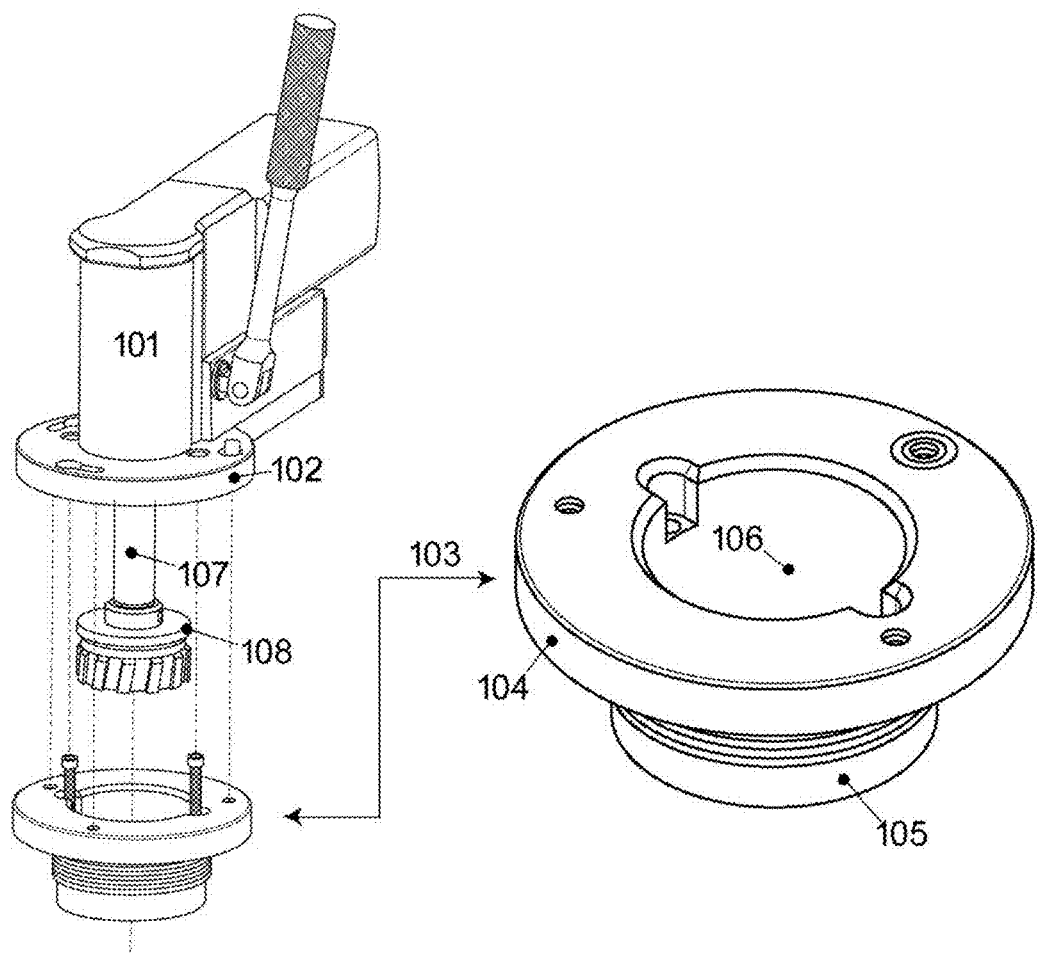
FIG. 5 shows the boring motor along with its associated functional components, including the boring mounting plate, boring shaft, boring cutter, and boring plug. The figure also provides an enlarged perspective view of the boring plug, highlighting the locations of the boring hole, plug flange, and threaded boring barrel. In accordance with an exemplary embodiment of the present invention.
Figure 6:
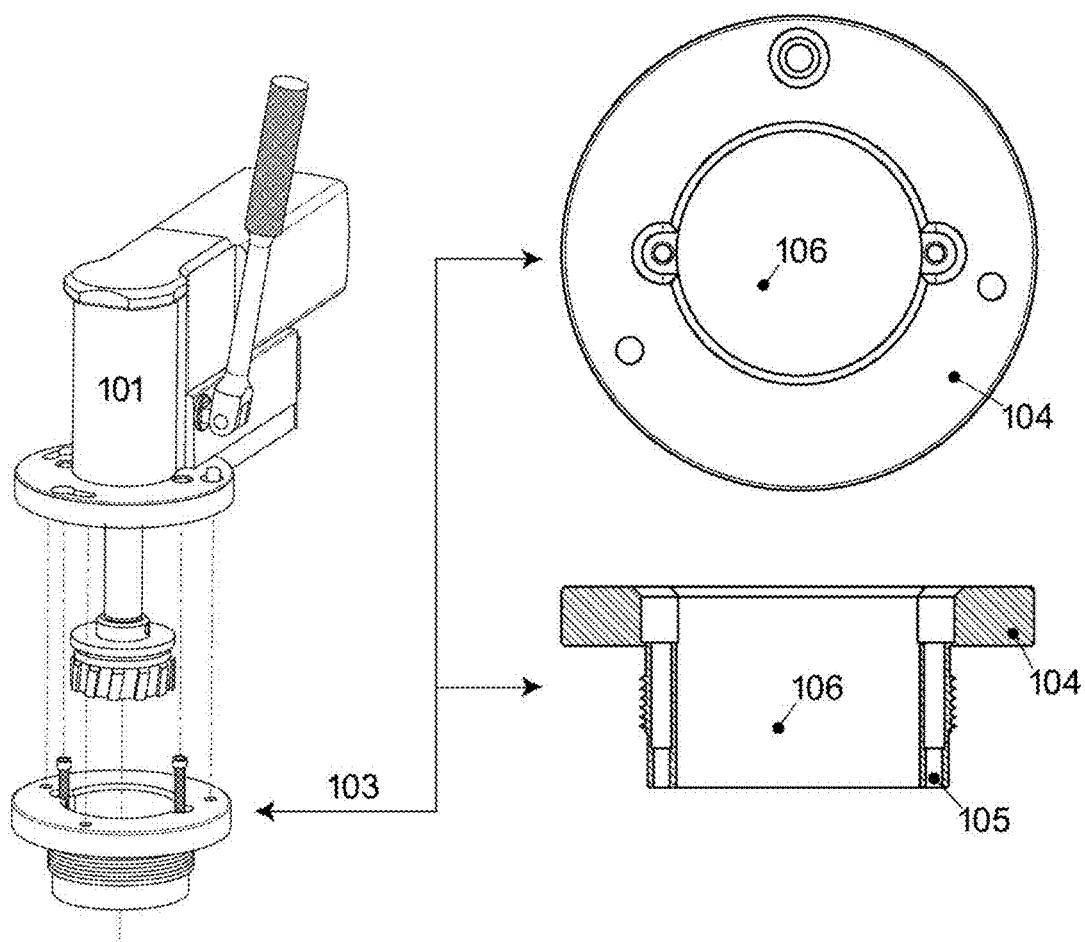
FIG. 6 shows the boring motor along with its associated functional components, including the boring mounting plate, boring shaft, boring cutter, and boring plug. The figure provides enlarged top and side views of the boring plug, clearly outlining the positions of the boring hole, plug flange, and threaded boring barrel. In accordance with an exemplary embodiment of the present invention.
Figure 7:
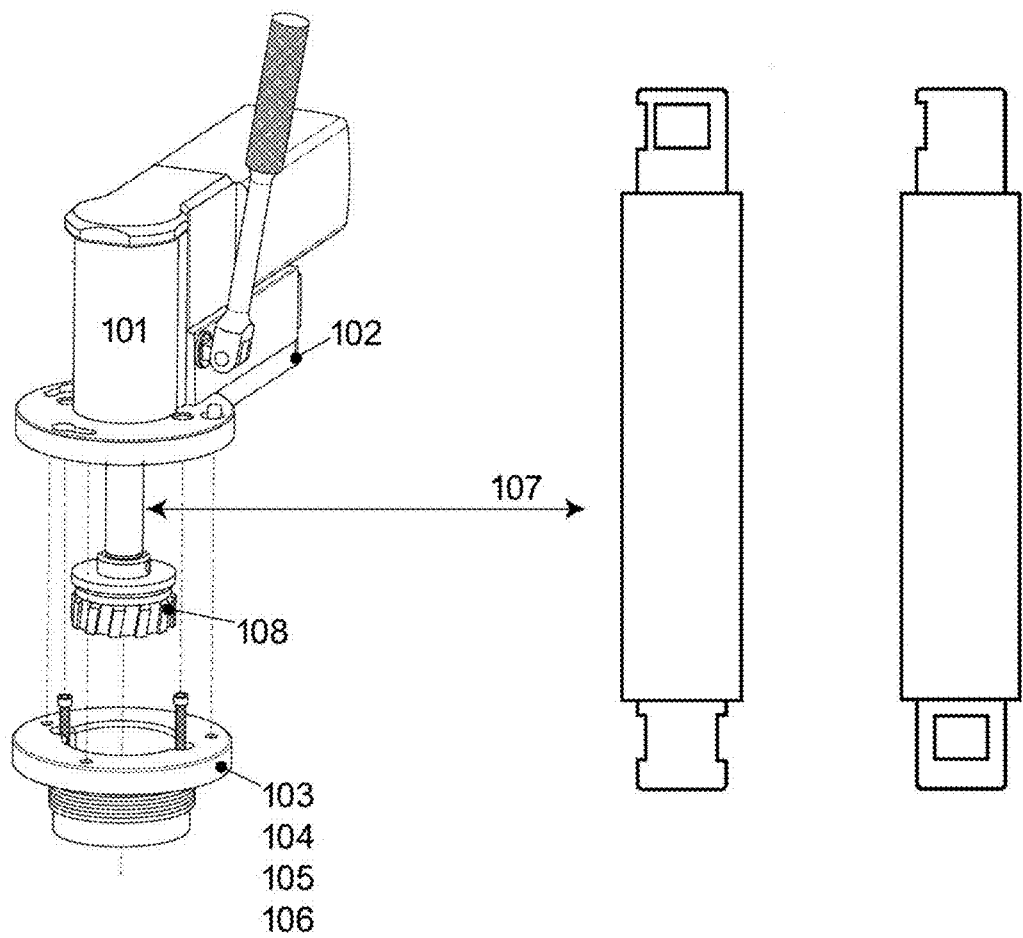
FIG. 7 shows the boring motor along with its associated functional components, including the boring mounting plate, boring cutter, and boring plug. The figure provides enlarged front and side views of the boring shaft, detailing features that are essential for proper alignment and operation within the system. In accordance with an exemplary embodiment of the present invention.
Figure 8:
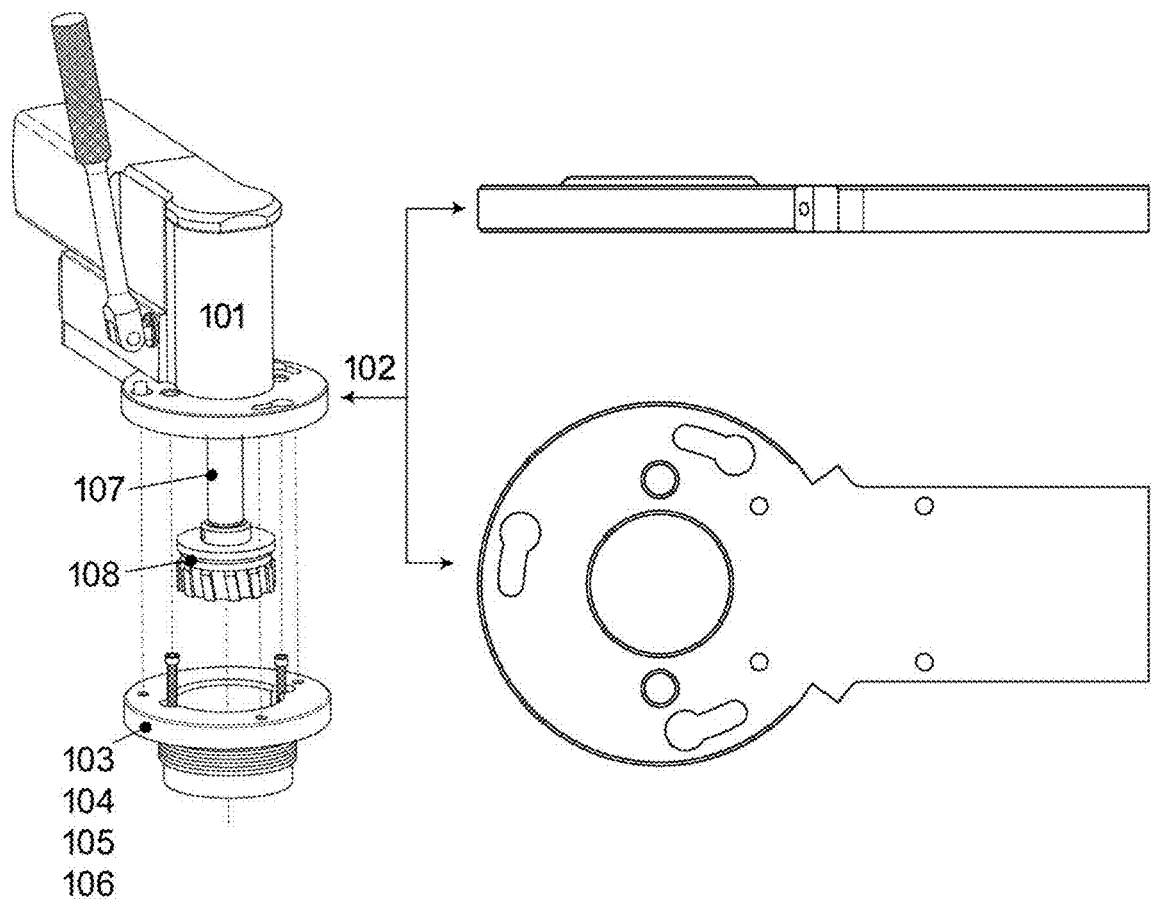
FIG. 8 shows the boring motor along with its associated components, including the boring shaft, boring cutter, and boring plug. The figure provides enlarged side and top views of the boring mounting plate, highlighting its structure and connection points, essential for securing the boring motor during operation. In accordance with an exemplary embodiment of the present invention.
Figure 9:
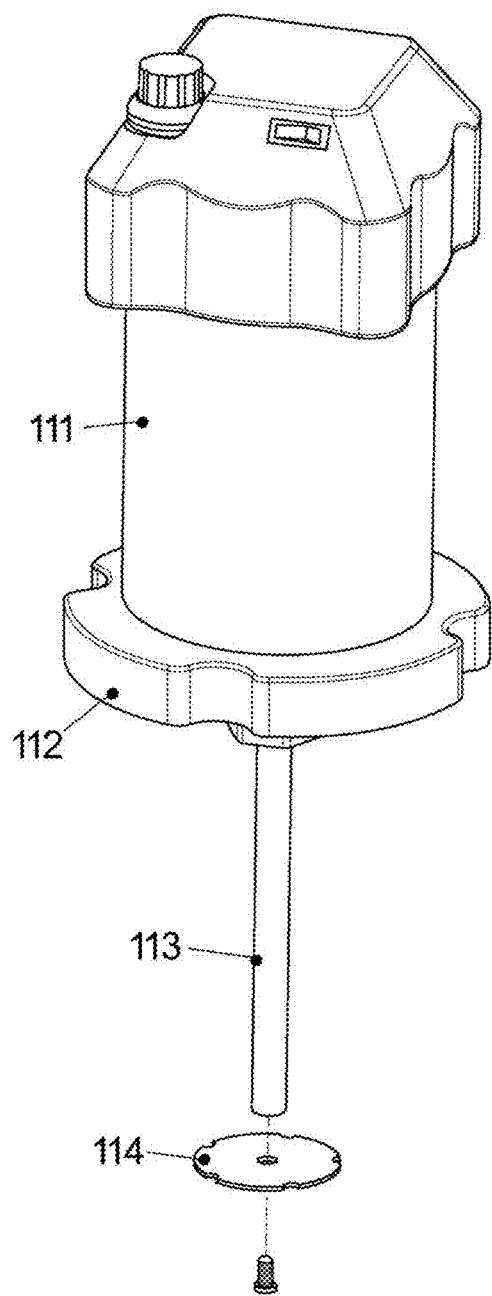
FIG. 9 shows the rotary motor (used during Operation 2) along with its associated components, including the rotary mounting plate, cutting wheel shaft, and cutting wheel, which is attached to the shaft using a small screw. The rotary motor is positioned on top of the housing, with the rotary mounting plate resting on the housing rim. This setup allows the operator to manually move the cutting wheel in a circular motion, creating a separating cut along the ring cut-off plane to sever the mushroomed piston ring from the piston barrel. In accordance with an exemplary embodiment of the present invention.
Figure 10:
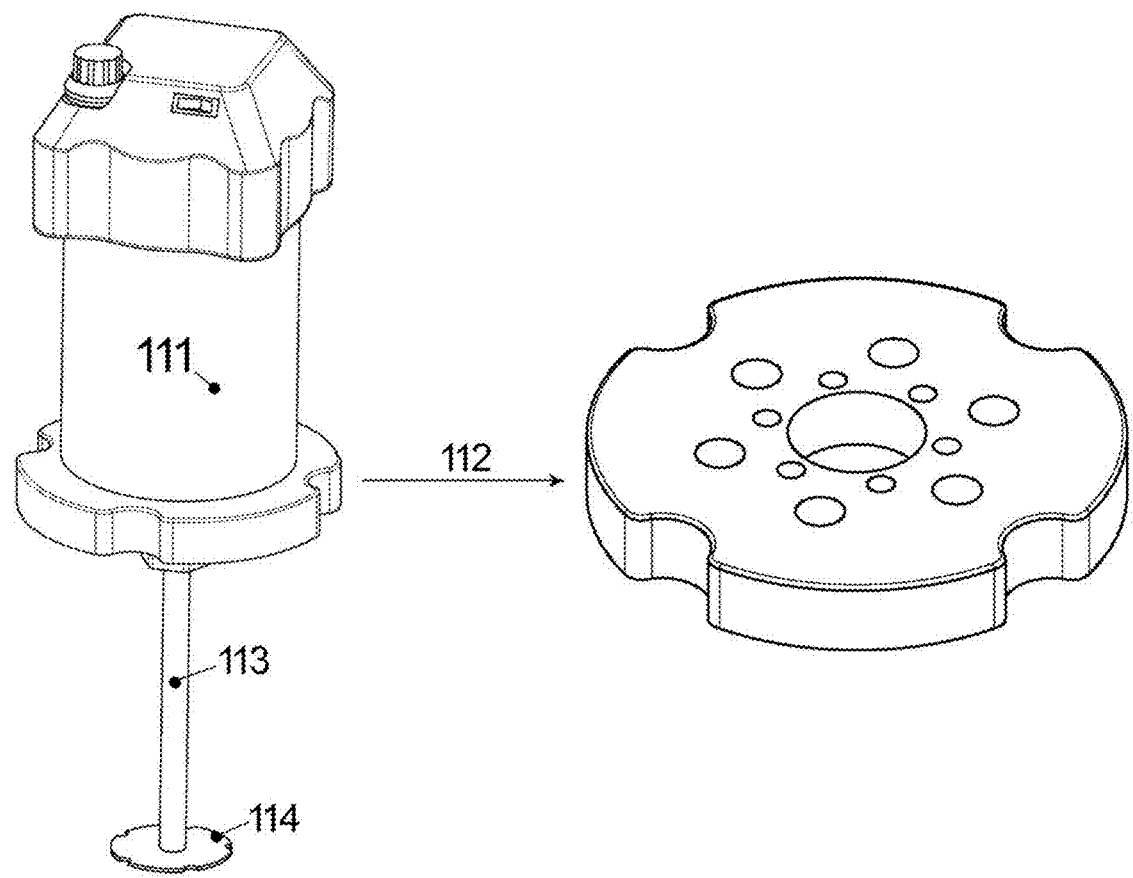
FIG. 10 shows the rotary motor along with its associated components, including the rotary mounting plate, cutting wheel shaft, and cutting wheel. The figure provides an enlarged perspective view of the rotary mounting plate, highlighting its structure and connection points, which are essential for securing the rotary motor during operation. In accordance with an exemplary embodiment of the present invention.
Figure 11:
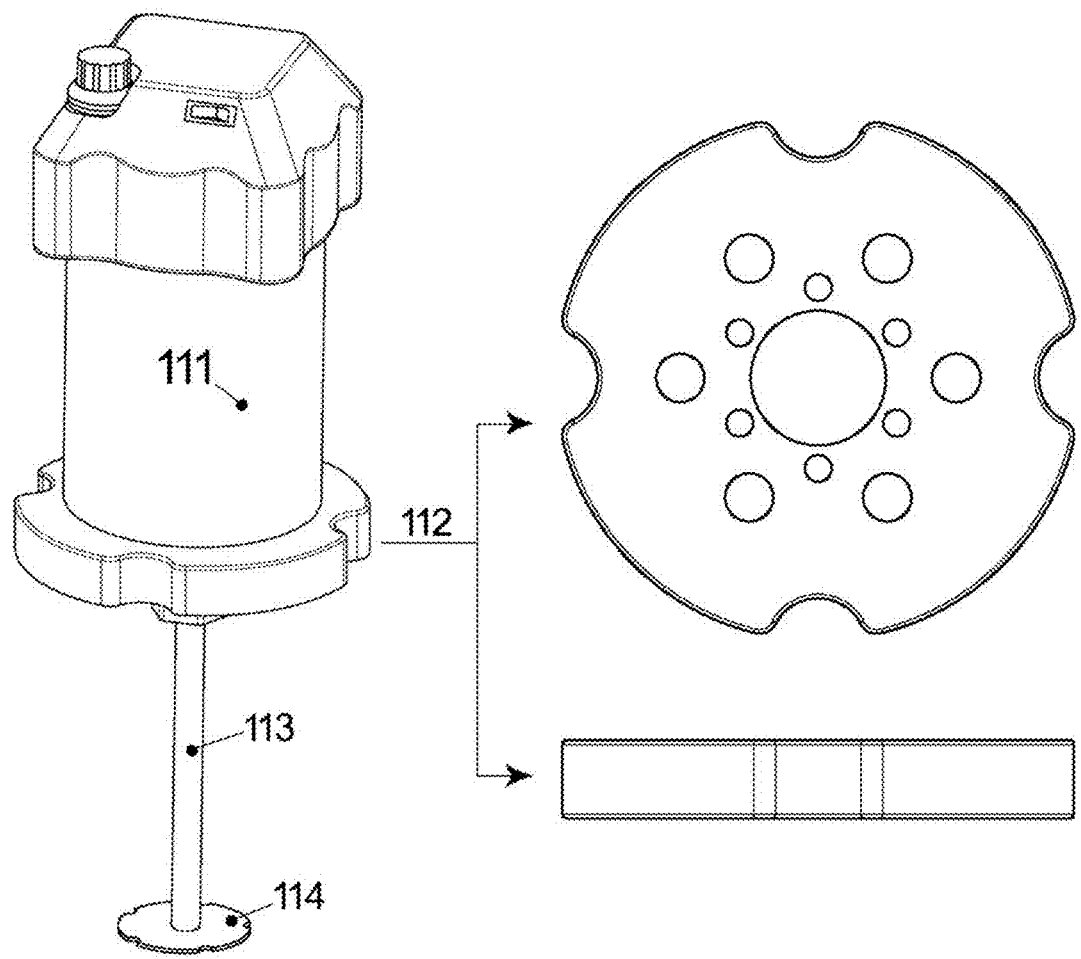
FIG. 11 shows the rotary motor along with its associated components, including the rotary mounting plate, cutting wheel shaft, and cutting wheel. The figure provides enlarged top and side views of the rotary mounting plate, clearly showing its structure and connection points, which are essential for securing the rotary motor during operation. In accordance with an exemplary embodiment of the present invention.
Figure 12:
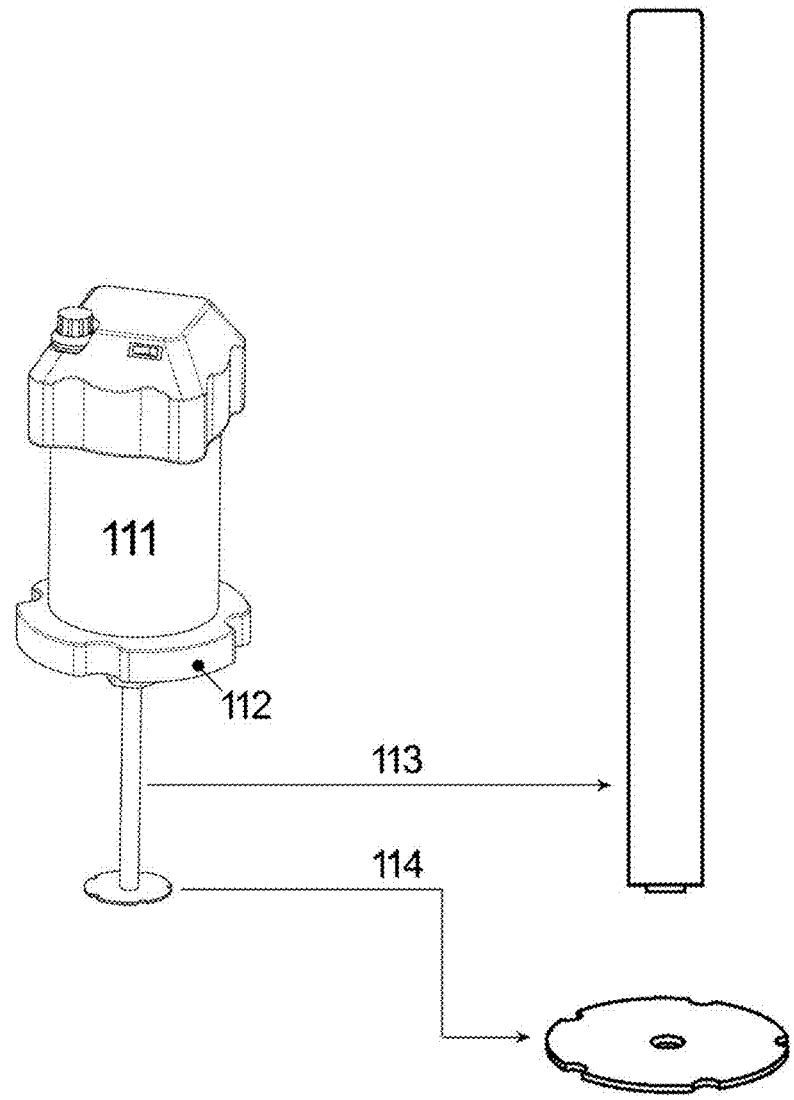
FIG. 12 shows the rotary motor along with its associated components, including the rotary mounting plate, cutting wheel shaft, and cutting wheel. The figure provides an enlarged view of both the cutting wheel shaft and the cutting wheel, detailing their structure and the connection between them, which is essential for ensuring proper alignment and functionality during operation. In accordance with an exemplary embodiment of the present invention.
Figure 13:
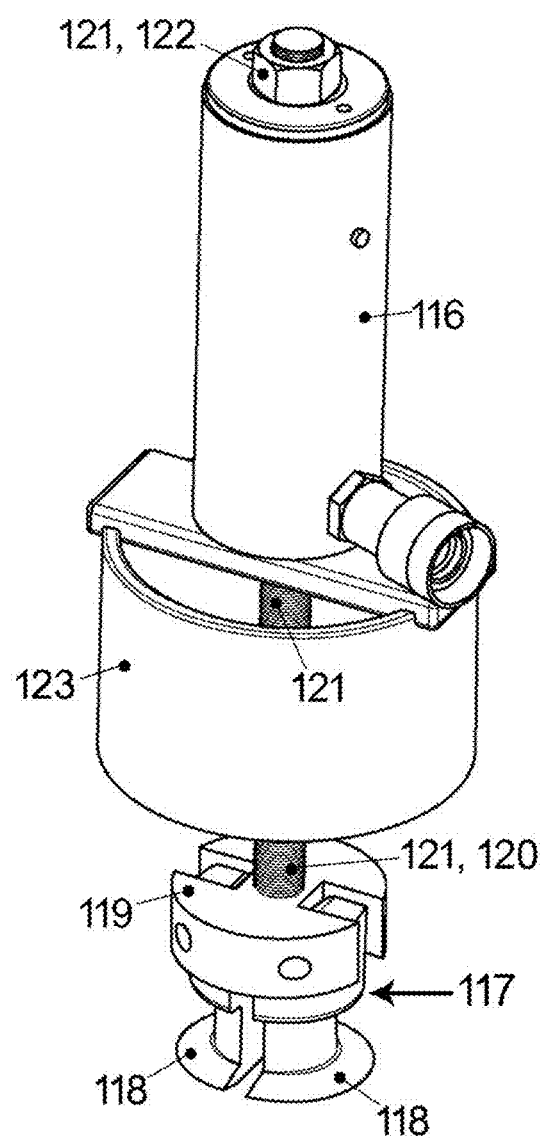
FIG. 13 shows the fully assembled components along with the power tool used to complete the third operation. Descriptive keys are used to outline the positioning of the puller screw, threaded connector, hydraulic tubular actuator, tube spacer, and puller tool. The puller tool consists of two wedge plates, a clamp, and a threaded wedge hole. The threaded wedge hole allows the puller screw to pass through, and adjusting the screw causes the two wedge plates to open or close, enabling a secure grip (or wedging inside the separating cut) of the piston barrel to be extracted from the housing. In accordance with an exemplary embodiment of the present invention.
Figure 14:
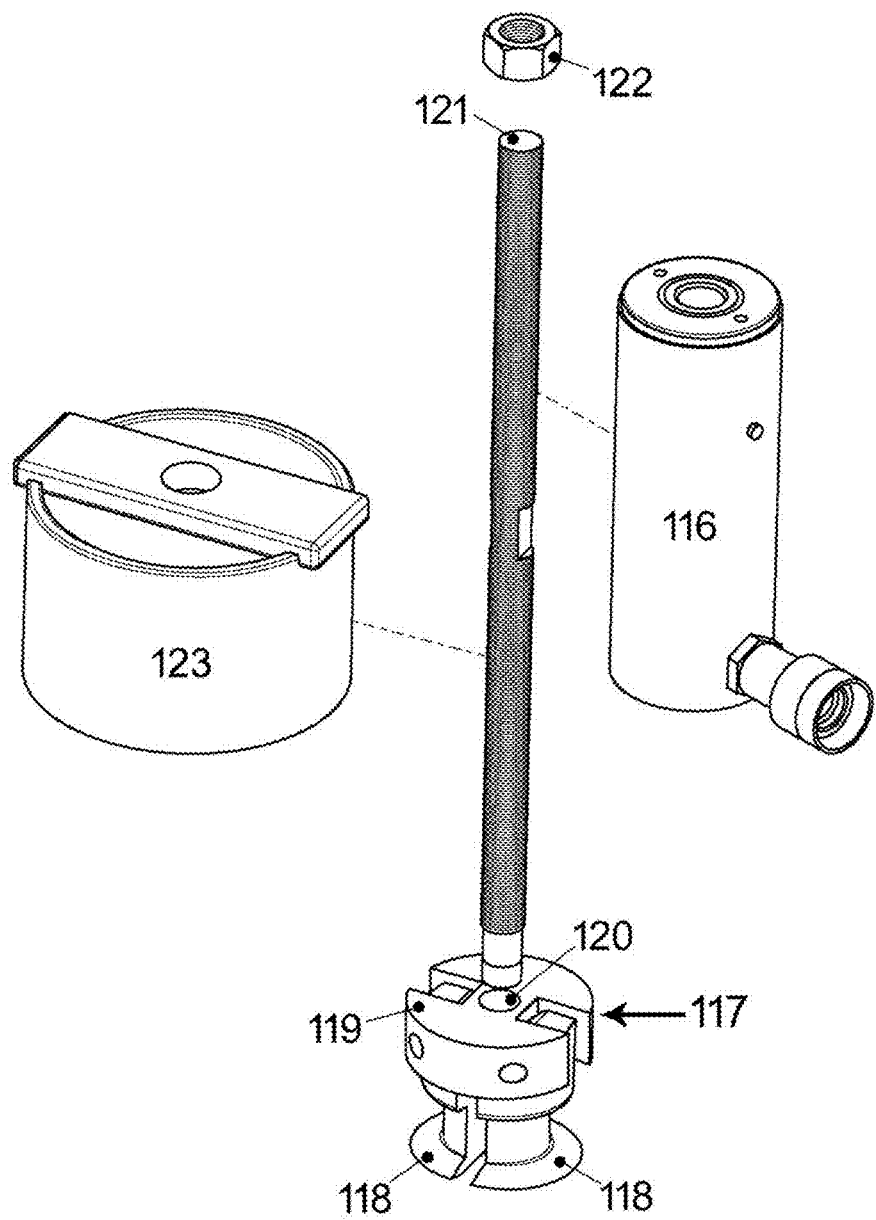
FIG. 14 shows an exploded view of the components used in the third operation, along with the power tool required for the process. The figure separates and labels the puller screw, threaded connector, hydraulic tubular actuator, tube spacer, and puller tool, providing a clear view of their arrangement and assembly. The puller tool remains fully assembled, with its two wedge plates held together by the clamp and aligned with the threaded wedge hole. This configuration ensures the puller screw can pass through the threaded hole, with adjustments controlling the wedge plates' movement to secure the piston barrel during extraction. In accordance with an exemplary embodiment of the present invention.
Figure 15:
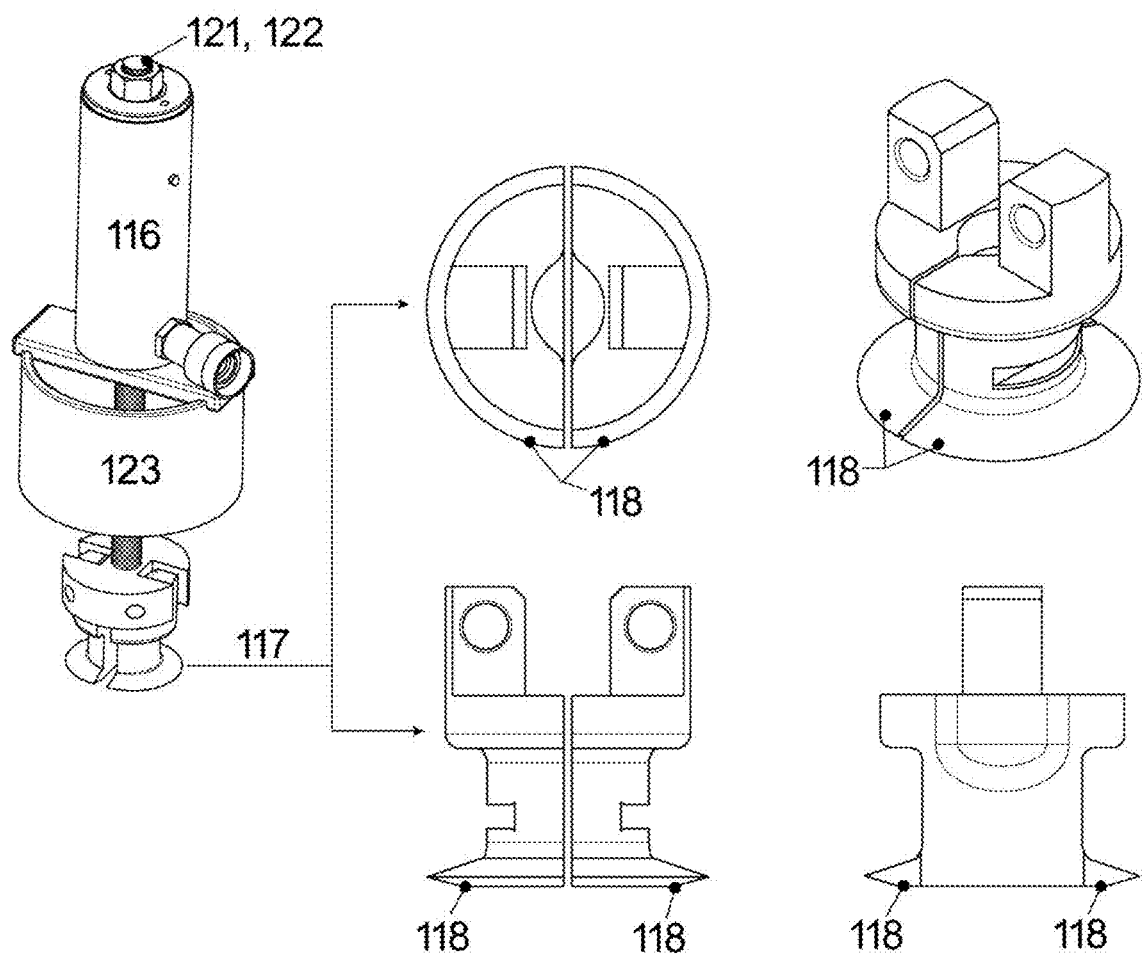
FIG. 15 shows the fully assembled components along with the power tool used to complete the third operation. Descriptive keys are used to outline the positioning of the puller screw, threaded connector, hydraulic tubular actuator, tube spacer, and puller tool. The figure provides an enlarged view of the two wedge plates of the puller tool, including four distinct views: a perspective view, top view, front view, and side view. These views show the shape, sharp edges, and alignment of the plates. In accordance with an exemplary embodiment of the present invention.
Figure 16:
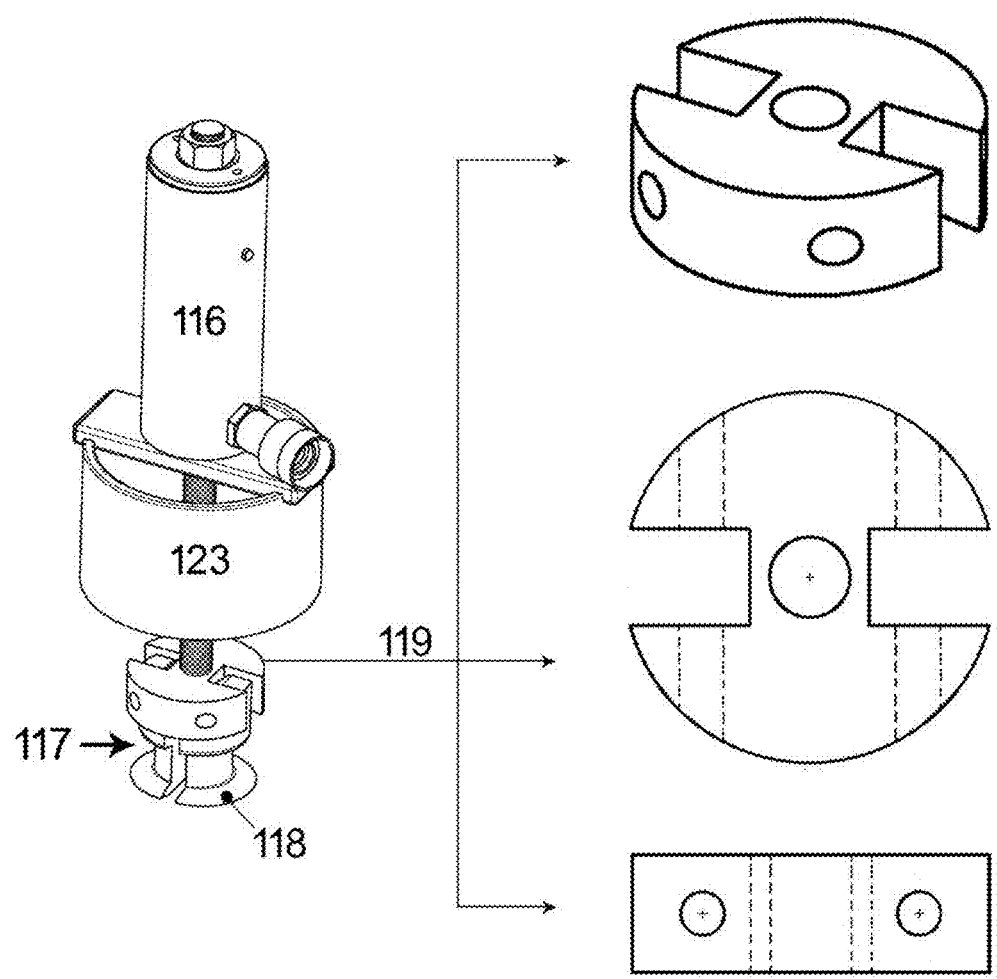
FIG. 16 shows the fully assembled components along with the power tool used to complete the third operation. Descriptive keys are used to outline the positioning of the puller screw, threaded connector, hydraulic tubular actuator, tube spacer, and puller tool. The figure provides an enlarged view of the clamp designed to work with the two wedge plates, including three distinct views: a perspective view, top view, and side view. In accordance with an exemplary embodiment of the present invention.

As shown in FIG. 1, the present invention, "Apparatus and Method for Extracting a Seized Yaw Piston from a Wind Turbine Housing," 100 provides an efficient solution for removing seized yaw pistons, which are critical components of the yaw system located between the nacelle and the tower of a wind turbine. As shown in FIG. 2, the yaw piston controls the rotational movement of the nacelle, ensuring that the rotor blades are properly aligned with the wind direction to optimize energy capture. Over time, these pistons can become seized inside the housing due to damage, dirt, grease, or deformation into what is known as a mushroomed piston ring. This invention introduces a system utilizing three distinct operations, supported by power tool (show in FIG. 3) and specialized components, to extract these seized yaw pistons safely and efficiently.

Operation 1, shown in FIGS. 4-8 and 18-19, begins with the removal of the piston washer 209 from the yaw piston 200. Then, a boring plug 103 is inserted into the housing 300, ensuring that the plug flange 104 rests against the housing rim 301 for proper alignment. A plurality of retention screws 109 is threaded through the plug flange 104 and threaded boring barrel 105, pressing against the piston rim 201 to secure the yaw piston 200 during the boring process. A boring motor 111, mounted via the boring mounting plate 102, drives a boring shaft 107 connected to a boring cutter 108. The boring cutter rotates within the piston cavity 203, passing through the boring hole 106 of the boring plug 103. The boring cutter 108 removes the center core 202 of the yaw piston 200, creating space for subsequent operations.

Figure 17:
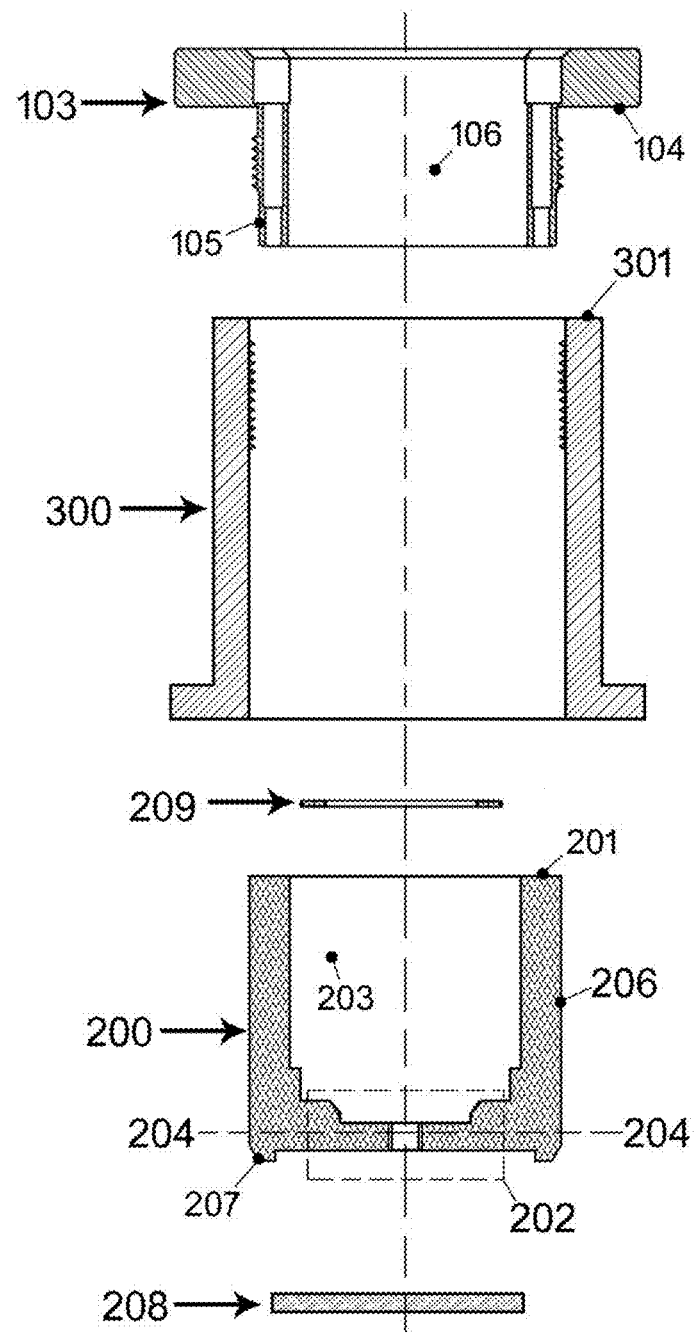
FIG. 17 shows sectional views of the boring plug, housing, piston washer, and yaw piston. Descriptive key numbers are used to identify various features of these components. This figure highlights the location of the housing rim, which makes contact with the plug flange, as well as key features of the yaw piston, including the piston rim, piston cavity, ring cut-off plane, center core, piston barrel, and mushroomed piston ring. In accordance with an exemplary embodiment of the present invention.
Figure 18:
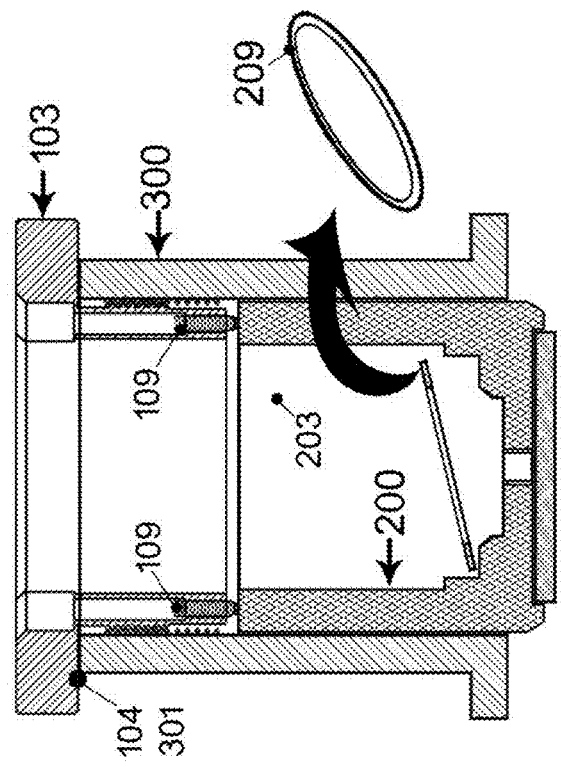
FIG. 18 provides two illustrations to guide the user in understanding the method outlined in this invention. This marks the beginning of Operation 1. The illustration on the left shows the first step, where the boring plug is positioned before being threaded into the housing. It also indicates where the plurality of retention screws will enter and depicts the positioning of the yaw piston, piston puck, and piston washer. The illustration on the right shows the next step in the sequence, with the boring plug fully threaded into the housing and the retention screws tightened against the rim of the yaw piston to prevent its movement. Additionally, it highlights that the piston washer, initially located inside the yaw piston, must be removed before proceeding to the next step in the method. In accordance with an exemplary embodiment of the present invention.
Figure 18:
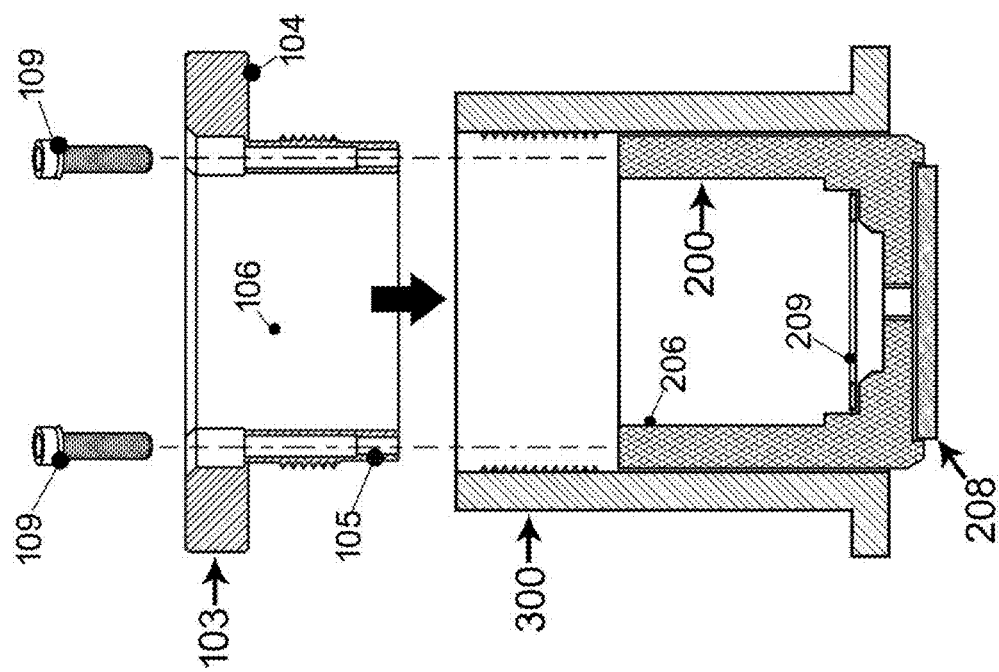
Figure 19:
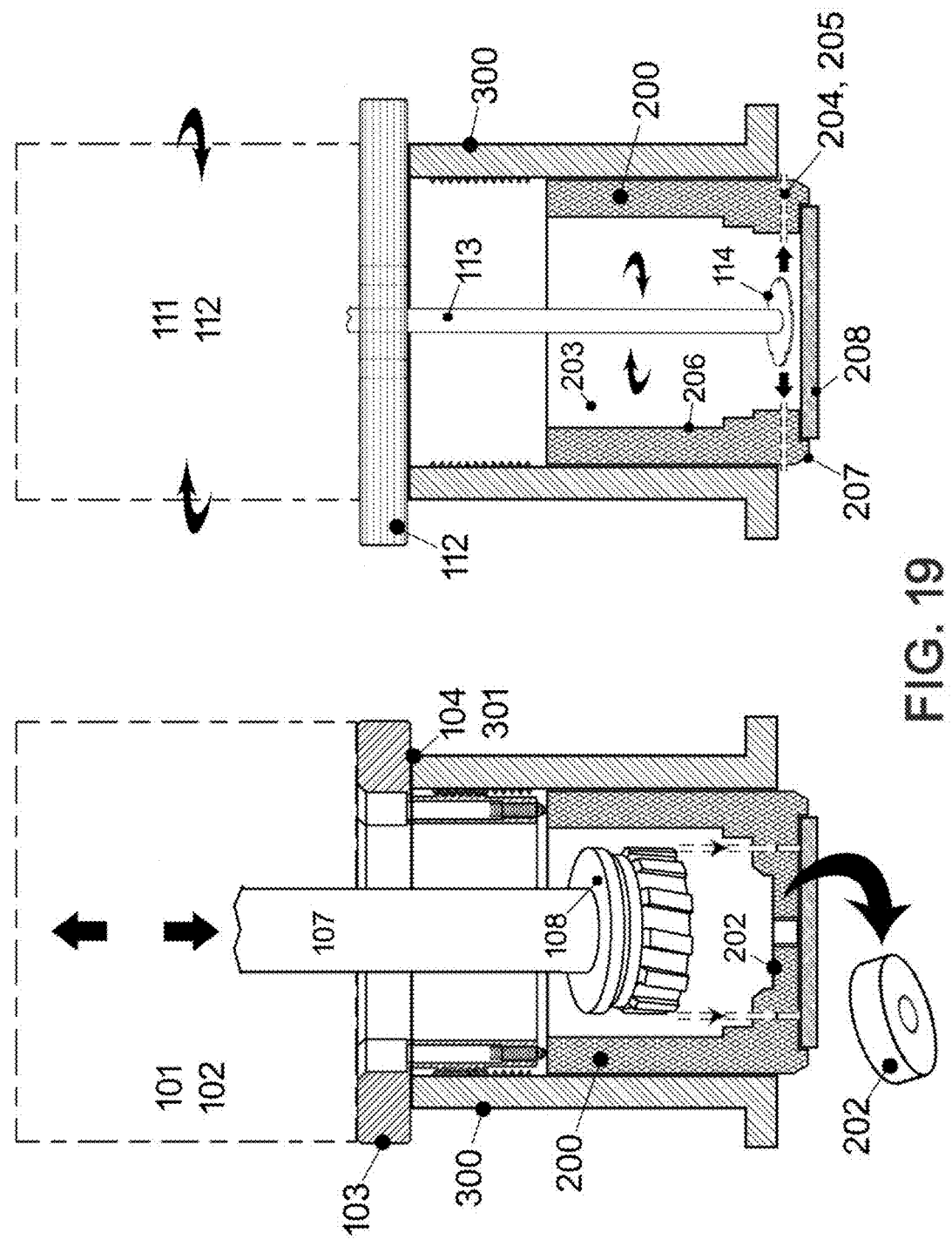
FIG. 19 shows two illustrations. The left side continues Operation 1, depicting where the boring cutter penetrates the yaw piston, separating the center core from the rest of the piston. The illustration also indicates that the center core must be removed after the cut is completed. The right side shows the beginning of Operation 2. Here, the boring plug has been removed, and a rotary mounting plate holding the rotary motor is positioned atop the housing, resting on the housing rim. The illustration displays the cutting wheel shaft and cutting wheel, aligned at the ring cut-off plane. Circular arrows indicate that the operator manually moves the rotary motor in a circular motion, creating a separating cut along the ring cut-off plane. This cut results in the separation of the mushroomed piston ring from the piston barrel. In accordance with an exemplary embodiment of the present invention.

Operation 2, shown in FIGS. 9-12 and 19-20, involves the use of a rotary motor 111, which is attached to the rotary mounting plate 112 and positioned atop the housing rim 301. The cutting wheel 114, connected via a cutting wheel shaft 113, aligns with the ring cut-off plane 204 on the yaw piston 200. The operator manually rotates the rotary motor 111 in a circular motion, driving the cutting wheel 114 to create a precise separating cut 205 along the ring cut-off plane 204, shown in FIGS. 17 and 19. This cut severs the mushroomed piston ring 207 from the piston barrel 206, enabling the next stage of the process.

Figure 20:
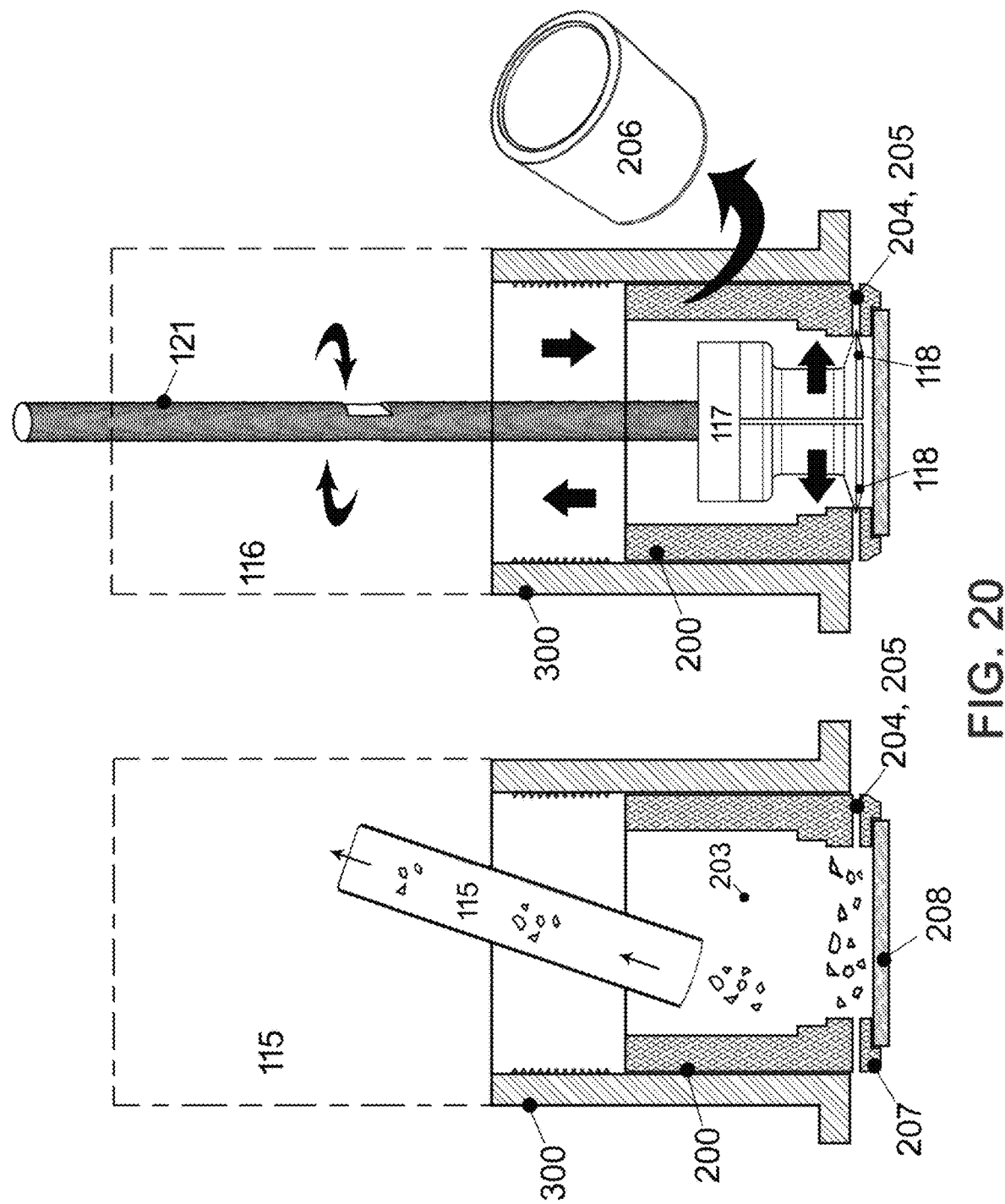
FIG. 20 shows two illustrations. The illustration on the left depicts the final stage of Operation 2, where a vacuum is used to remove all debris generated by the boring cutter and cutting wheel. During this process, the operator should also verify that the cut along the ring cut-off plane is fully completed and that the mushroomed piston ring is loose and movable, confirming that the cut was successful and the ring is ready for removal. The illustration on the right shows the beginning of Operation 3. Here, the puller tool, along with the puller screw, is placed inside the yaw piston cavity, ensuring the puller tool makes contact with the yaw piston. The operator then rotates the puller screw, either manually or with a wrench, to separate the two wedge plates sufficiently, allowing them to engage the separating cut along the ring cut-off plane. Next, the operator places the tube spacer over the puller screw, followed by the hydraulic tubular actuator, securing it with a threaded connector. The hydraulic actuator then applies the necessary force to retract the puller tool, ensuring the piston barrel is removed from the housing. In accordance with an exemplary embodiment of the present invention.
Figure 21:
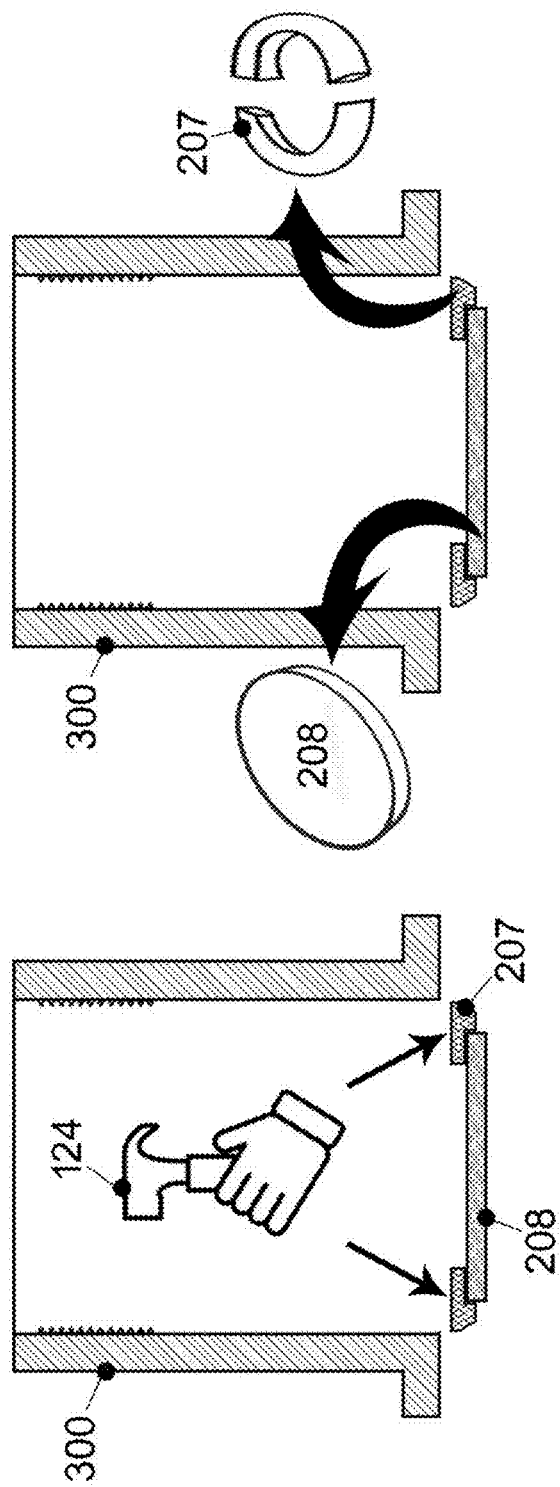
FIG. 21 shows two illustrations focusing on the final steps of Operation 3. The illustration on the left depicts the use of manual tools, such as a hammer and chisel, to break apart the mushroomed piston ring. Typically, the ring must be broken in two places for proper removal, though additional breakage may be required based on the operator's judgment. The illustration on the right shows that once the mushroomed piston ring has been broken and removed from the housing, the piston puck is also removed. With the completion of these steps, the operation is concluded, marking the final stage of the method outlined herein.

Once the cutting operation is complete, debris generated by both the boring cutter 108 and cutting wheel 114 is removed using a vacuum system 115, shown in FIG. 20. The operator ensures that the mushroomed ring 207 is loose, confirming the separation and readiness for removal.

Operation 3, shown in FIGS. 13-16 and 20-21, begins by inserting the puller tool 117 into the piston cavity 203, ensuring it rests on the piston puck 208. The puller tool 117 consists of two wedge plates 118, semicircular in shape with sharp edges, held together by a clamp 119. A puller screw 121, which is an Acme threaded rod, passes through a threaded wedge hole 120 between the two wedge plates 117. As the operator rotates the puller screw 121 manually or with a wrench, the plates 117 expand within the separating cut 205, creating a secure grip on the piston barrel 206, as shown in FIG. 20.

A hydraulic tubular actuator 116 is connected to the puller screw using a threaded connector 122 (an Acme nut). The actuator 116, positioned over the puller screw 121 with the aid of a tube spacer 123, provides the force needed to retract the puller tool 117 and extract the piston barrel 206 from the housing 300. This controlled extraction ensures minimal damage to the housing 300.

Once the piston barrel 206 is removed, manual tools 124, such as a hammer and chisel, are used to break the mushroomed piston ring 207 into two or more pieces, allowing for easy removal. The piston puck 208 is then extracted from the housing 300, completing the operation.

The invention addresses the challenges of extracting seized yaw pistons in confined turbine spaces where conventional tools and methods are insufficient. The combination of specialized tools and sequential operations ensures that the removal process is efficient, safe, and minimizes the risk of damage to other components. The modular design of the boring plug, rotary motor, and puller tool allows for easy assembly, operation, and maintenance, ensuring the effective implementation of the invention across different turbine systems.

We claim:

1. A device for removing a yaw piston seized inside a housing of a wind turbine, comprising:
    (A) a boring motor configured for manual controllable axial material removal from the yaw piston;
    (B) a boring plug configured for threaded insertion into the housing comprising a plug flange, a threaded boring barrel, and a boring hole,
    (C) wherein the boring plug further comprises a plurality of retention screws, threadably extending from the plug flange and through the threaded boring barrel, configured to press against a piston rim, to prevent movement of the yaw piston during operation of the boring motor;
    (D) a boring mounting plate configured to releasably attach the boring motor to the boring plug;
    (E) a boring cutter configured to remove a center core from the yaw piston,
    (F) a boring shaft operably connecting the boring cutter to the boring motor;
        wherein the boring shaft is configured to pass through the boring hole and into a piston cavity, and to rotate the boring cutter at a predefined speed to facilitate removal of the center core;
    (G) a rotary motor configured for manual, controllable axial rotation of a cutting wheel, the cutting wheel being operably connected to the rotary motor via a cutting wheel shaft;
    (H) a rotary mounting plate configured to releasably attach to the rotary motor;
        (a) wherein the rotary mounting plate, with the rotary motor attached, is configured to rest on a housing rim, positioning the cutting wheel at a ring cut-off plane;
        (b) wherein the rotary motor is further configured for manual circular movement, enabling a separating cut along the ring cut-off plane, to separate a mushroomed piston ring from a piston barrel;
    (I) a puller tool, configured to fit inside the piston barrel resting on a piston puck, having
        (a) two wedge plates, semicircular in shape with edges, sandwiched together by a clamp;

(b) the two wedge plates further comprising a threaded wedge hole positioned between them;
(J) a puller screw configured to be inserted through the threaded wedge hole to spread the two wedge plates apart into the separating cut made by the cutting wheel, providing a grip to extract the piston barrel from the housing;
(K) a hydraulic tubular actuator configured to provide force by extending or retracting, enabling controlled movement of the puller screw;
(L) a threaded connector configured to releasably attach the puller screw to the hydraulic tubular actuator;
(M) a tube spacer configured to provide spacing between the housing and the hydraulic tubular actuator;
(N) a plurality of manual tools for breaking the mushroomed piston ring enabling removal of the mushroomed piston ring and the piston puck.

2. The device for removing the yaw piston seized inside the housing of the wind turbine of claim 1, wherein: the boring plug when threaded into the housing is configured so that the plug flange rests against the housing rim.

3. The device for removing the yaw piston seized inside the housing of the wind turbine of claim 1, wherein: when the boring plug is threaded inside the housing the threaded boring barrel is configured not to make contact with the piston rim.

4. The device for removing the yaw piston seized inside the housing of the wind turbine of claim 1, further comprising: a plurality of mounting screws configured to releasably mount the boring mounting plate to the boring plug.

5. The device for removing the yaw piston seized inside the housing of the wind turbine of claim 1, further comprising: a vacuum system for removing debris generated by the cutting wheel operation.

6. The device for removing the yaw piston seized inside the housing of the wind turbine of claim 1, wherein: the puller screw is an Acme threaded rod.

7. The device for removing the yaw piston seized inside the housing of the wind turbine of claim 1, wherein: the threaded connector is an Acme nut.

8. The device for removing the yaw piston seized inside the housing of the wind turbine of claim 1, wherein: said plurality of manual tools is a hammer and a chisel.

9. A method for removing a yaw piston seized inside a housing of a wind turbine, comprising the steps of:
(A) threading a boring plug into the housing, the boring plug comprising a plug flange, a threaded boring barrel, and a boring hole;
(B) extending a plurality of retention screws from the plug flange through the threaded boring barrel to press against a piston rim, securing the yaw piston in place;
(C) attaching a boring motor to the boring plug using a boring mounting plate;
(D) using a plurality of mounting screws to releasably mount the boring mounting plate to the boring plug;
(E) passing a boring shaft through the boring hole and into a piston cavity, the boring shaft operably connecting the boring motor to a boring cutter;
(F) rotating the boring cutter about its longitudinal axis using the boring motor at a predefined speed to remove a center core from the yaw piston;
(G) removing the boring motor, the boring plug, and the boring cutter;
(H) installing a rotary motor onto a rotary mounting plate,
(I) connecting a cutting wheel to the rotary motor via a cutting wheel shaft;
(J) placing the rotary mounting plate onto the housing rim so that the cutting wheel is positioned at a ring cut-off plane;
(K) manually rotating the rotary motor in a circular motion, causing the cutting wheel to create a separating cut along the ring cut-off plane, severing a mushroomed piston ring from a piston barrel;
(L) removing the rotary motor and the cutting wheel;
(M) vacuuming debris created by the cutting wheel;
(N) inserting a puller tool into the piston barrel, the puller tool comprising two wedge plates each semicircular in shape with sharp edges held together by a clamp;
(O) inserting a puller screw through a threaded wedge hole positioned between the two wedge plates and rotating the puller screw to spread the two wedge plates apart into the separating cut, gripping the piston barrel;
(P) attaching a hydraulic tubular actuator to the puller screw via a threaded connector and activating the hydraulic tubular actuator to apply force to the puller screw;
(Q) using a tube spacer to provide separation between the hydraulic tubular actuator and the housing during operation;
(R) activating the hydraulic tubular actuator to extract the piston barrel from the housing by pulling it upward along with the puller tool;
(S) breaking the mushroomed piston ring using a plurality of manual tools enabling removal of the mushroomed piston ring and the piston puck.

10. The method for removing the yaw piston seized inside the housing of the wind turbine of claim 9, wherein: prior to threading the boring plug into the housing a piston washer is removed.

11. The method for removing the yaw piston seized inside the housing of the wind turbine of claim 9, wherein: the boring plug when threaded into the housing is configured so that the plug flange rests against the housing rim.

12. The method for removing the yaw piston seized inside the housing of the wind turbine of claim 9, wherein: the boring plug is threaded inside the housing the threaded boring barrel is configured not to make contact with the piston rim.

13. The method for removing the yaw piston seized inside the housing of the wind turbine of claim 9, wherein: the puller screw is an Acme threaded rod.

14. The method for removing the yaw piston seized inside the housing of the wind turbine of claim 9, wherein: the threaded connector is an Acme nut.

15. The method for removing the yaw piston seized inside the housing of the wind turbine of claim 9, wherein: said plurality of manual tools is a hammer and a chisel.

* * * * *